Dec. 22, 1964

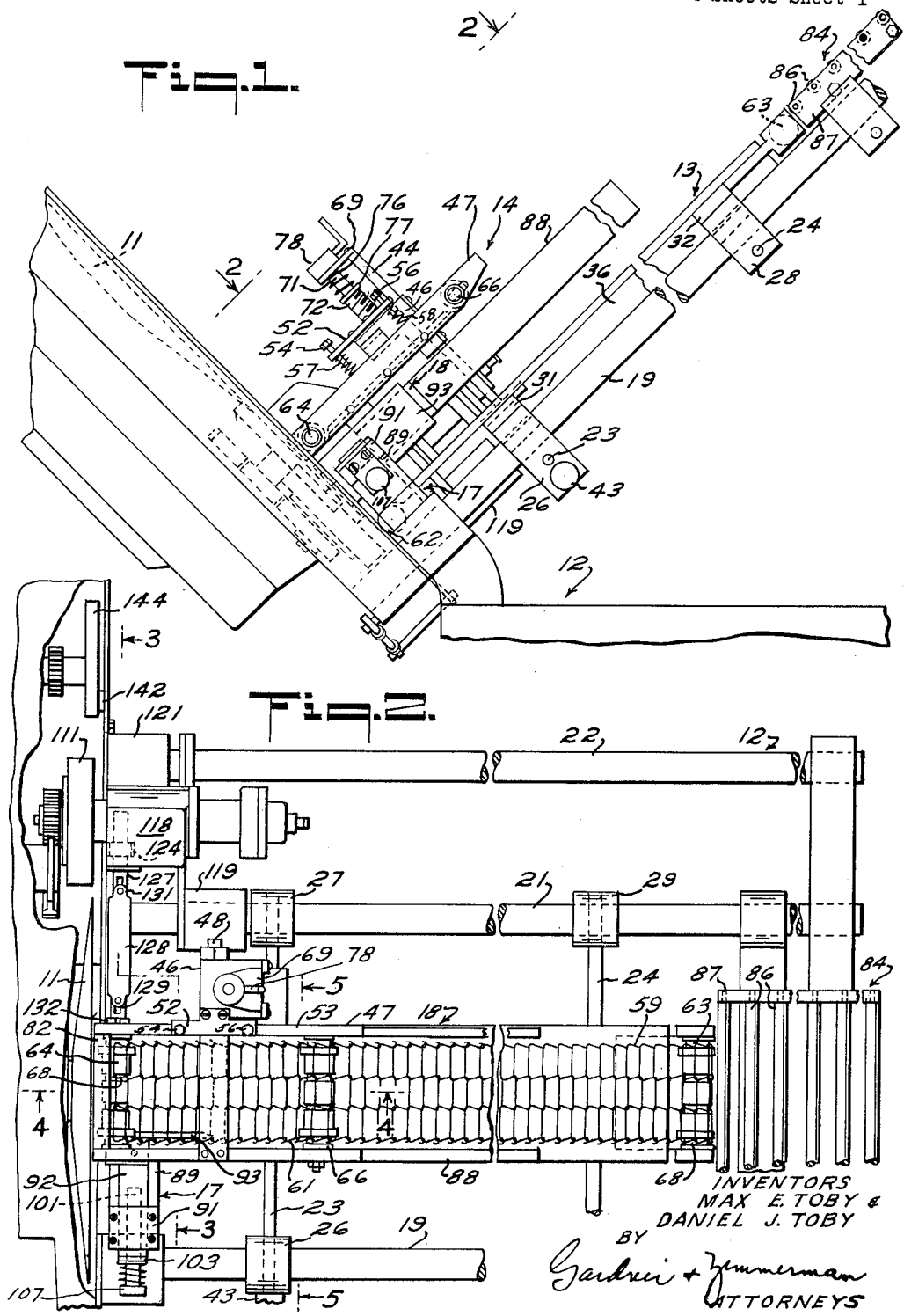

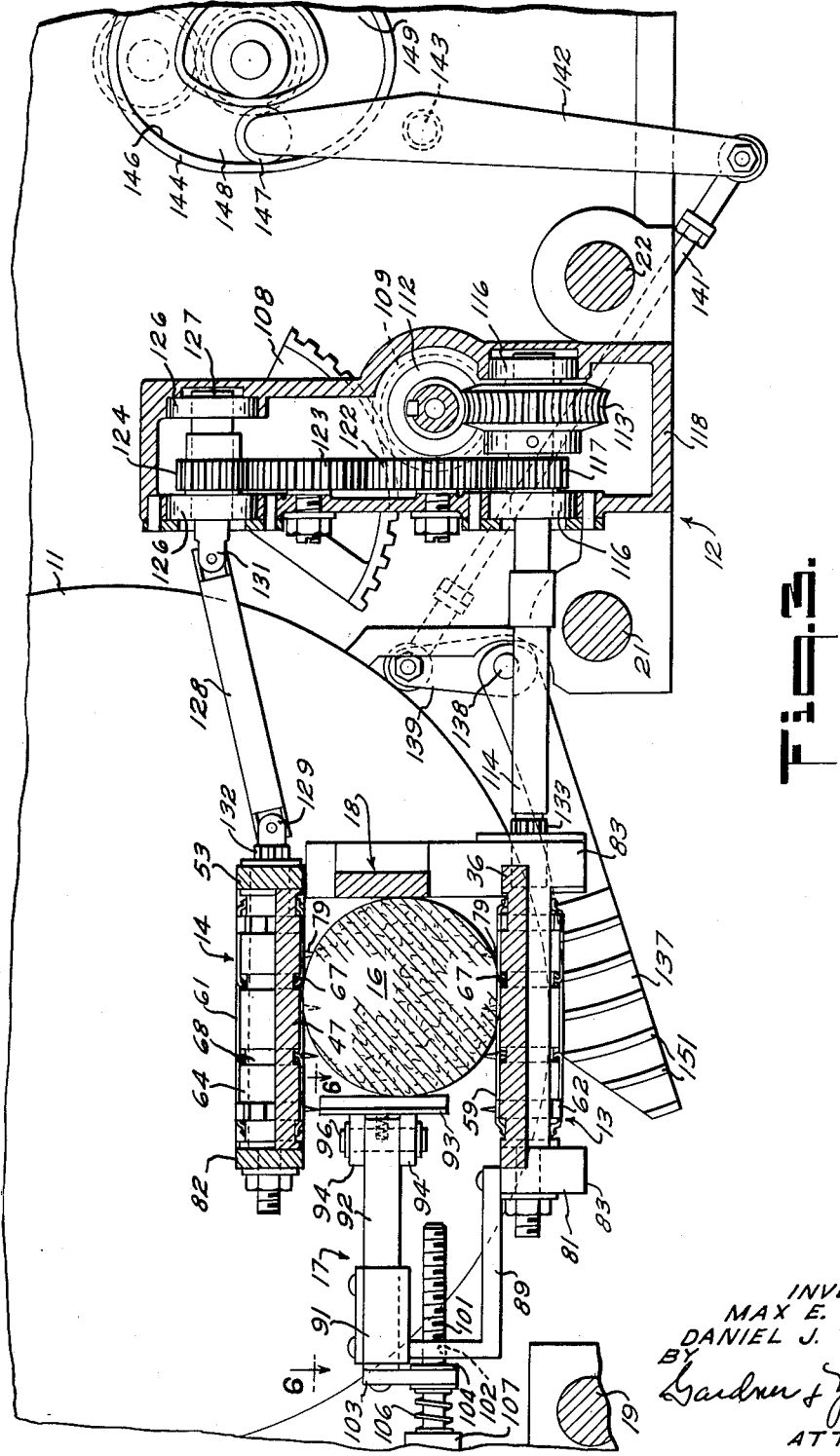

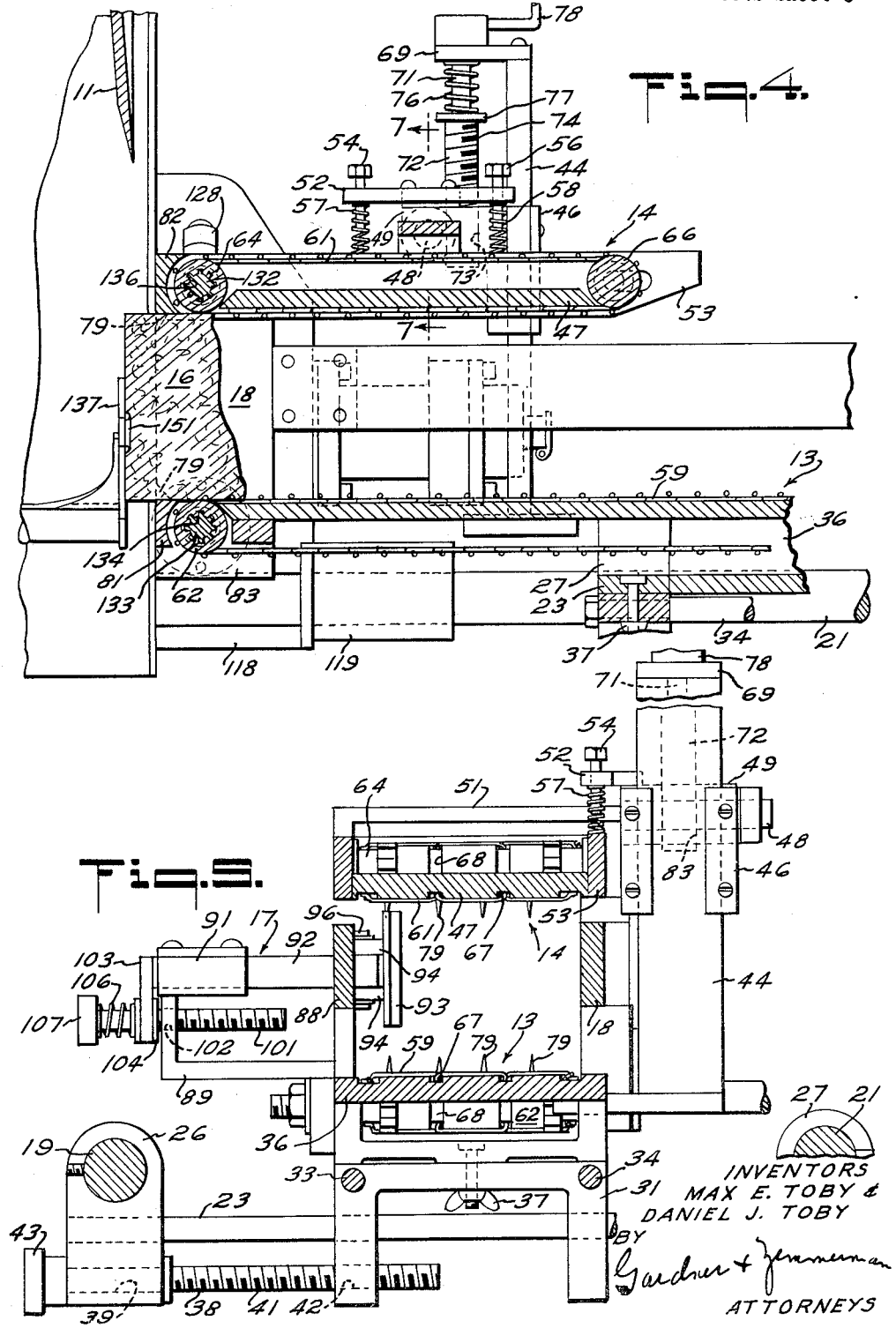

M. E. TOBY ETAL 3,162,226

SLICING MACHINE FEED APPARATUS

Filed Dec. 14, 1962

INVENTORS
MAX E. TOBY &
DANIEL J. TOBY
BY
Gardner & Zimmerman
ATTORNEYS

United States Patent Office 3,162,226
Patented Dec. 22, 1964

3,162,226
SLICING MACHINE FEED APPARATUS
Max E. Toby and Daniel J. Toby, San Francisco, Calif., assignors to Toby Enterprises, San Francisco, Calif., a corporation of California
Filed Dec. 14, 1962, Ser. No. 244,796
11 Claims. (Cl. 146—95)

This invention relates generally to machines and methods for slicing material, and is more particularly directed towards apparatus for feeding an elongated loaf of meat or the like into a slicing apparatus.

In Patent No. 2,752,968, issued July 3, 1956, entitled Material Advancing and Slicing Machine, there is disclosed an apparatus for cutting a plurality of slices from a loaf of luncheon meat or the like. This prior slicing machine, co-invented by one of the instant inventors, generally included a rotary cutting blade adapted for periodic rotary slicing movement in a plane generally perpendicular to a feed table on which the loaf of meat was placed. In order to incrementally advance the loaf towards the blade so as to produce uniform slices of predetermined thickness, a back feed clamp was provided and adapted to grasp the rearmost portion of the loaf and advance or push it towards the blade. This prior arrangement has a disadvantage in that it is necessary to return the back feed clamp to its starting position prior to inserting a new loaf for slicing. Accordingly, time is lost for each cycle of operation while the machine is being reset. A further disadvantage with the prior machine is that an unusable thick slice of meat is left at the end of each loaf, this being the portion into which the hooks of the meat clamp are secured. This end slice, generally over ½ inch thick, must accordingly be reprocessed or discarded as waste.

The feed apparatus of the present invention is intended to overcome the foregoing disadvantage and provide a vastly improved form of meat feed. In broad terms, the present apparatus comprises a pair of spaced conveyor means positioned adjacent the slicer blade and generally normal to the plane thereof. The two conveyors have opposed confronting inner reaches or portions that move synchronously towards the blade, whereby a loaf of meat can be engaged between these portions and incrementally fed into the slicer. Consequently, a plurality of loaves can be fed continuously one after another into engagement with the conveyors without having to reset the feed apparatus for each loaf. The conveyors are adjustable in their spacing relative to one another, so that loaves of varying thickness can be properly gripped by the conveyors for positive nonslip movement towards the blade. In addition, adjustable side clamp means are provided to guide the loaf properly between the conveyors. A further feature of the invention relates to support means provided adjacent the cutter blade for retaining the end portions of each loaf after they are no longer engaged by the conveyors. Such means includes a support bar that moves in generally the same plane as the cutter blade, and which prevents the small end portion of the loaf from falling loose each time the slicer blade disengages the loaf end. As a result, the wastage from each loaf is reduced to a minimum, and consequently extra slices are produced from each loaf than is capable with prior apparatus. The conveyors are also made adjustable for selective lateral positioning relative to the slicer. Because different types of materials composing the loaves give them different consistencies, the action of the blade slicing through various loaves may cause the meat slice, following the slicing operation to fall and come to rest at different lateral positions. By laterally adjusting the feed conveyors, it is possible to insure that the slices are properly deposited on a counting or other mechanism of the slicing machine, regardless of the consistency of the loaf.

Accordingly, a main object of the present invention is to provide novel and improved feed mechanism for slicing apparatus whereby loaves of sliceable material can be continuously fed towards the cutting blade without interruption, thereby reducing the time and steps involved in automatic slicing operations.

Another object of the invention is to provide apparatus of the character described in which means are provided to reduce to a minimum the amount of wastage for each loaf of material sliced.

A further object of this invention is to provide feed apparatus as above defined that is readily removable from the slicing machine for easy cleaning and maintenance.

Still another object of our invention is to provide apparatus of the type described that is easily adjusted to accommodate loaves of varying diameter or thickness.

Yet another object of the invention is to provide feed apparatus of the character described that is adjustable so that the loaf may be properly oriented relative to the slicer blade and the cut slices will be accordingly properly deposited on a counting and weighing mechanism, irrespective of the consistency of the loaf.

Referring to said drawings:

FIGURE 1 is a side elevation view of a slicing machine embodying the feed apparatus of the present invention.

FIGURE 2 is a plan view taken along the plane 2—2 of FIGURE 1.

FIGURE 3 is a cross sectional view on an enlarged scale taken along the plane 3—3 of FIGURE 2.

FIGURE 4 is a cross sectional view taken along the plane 4—4 of FIGURE 2.

FIGURE 5 is a cross sectional view taken along the plane 5—5 of FIGURE 2.

Figure 6:
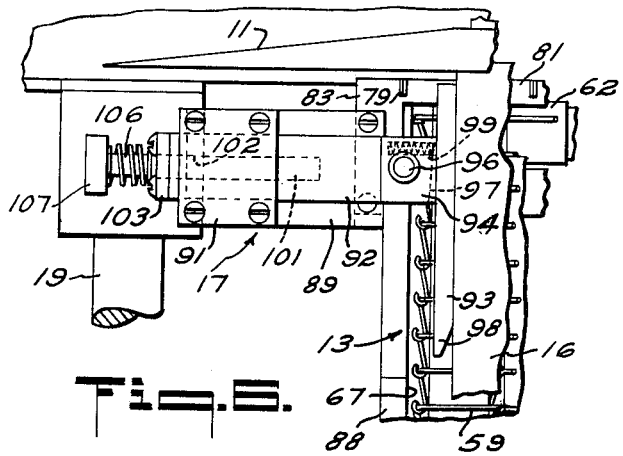
FIGURE 6 is a fragmentary cross sectional view taken along the plane 6—6 of FIGURE 3.
Figure 7:
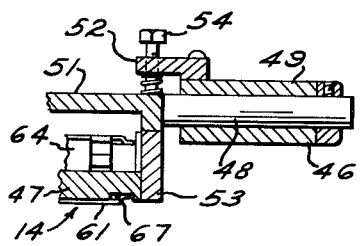
FIGURE 7 is a fragmentary cross sectional view taken along the plane 7—7 of FIGURE 4.

Referring now to the drawings, the feed apparatus of the present invention is shown operatively associated with a generally conventional slicing mechanism, as for example, a slicer of the type disclosed in said Patent 2,752,968. Such a slicer includes a circular slicing blade 11 adapted for rotation on its axis and generally mounted on a frame 12. More specifically, the blade 11 is mounted eccentrically on a rotary head member (not shown) whereby the blade itself is moved in an orbital path relative to the axis of the head member. Rotation of the head brings the independently rotating blade down and across a loaf, imparting a slashing cut thereto, and then raises the blade to disengage it from the loaf. A more detailed description of the cutting blade, head member, and drive means of the slicing mechanism is set forth in the aforesaid patent, but is not elaborated on herein as they form no part of the present invention.

With respect to the instant feed apparatus for bringing a loaf into position for the slicing operation, there is provided a bottom conveyor means 13 spaced below a top conveyor means 14, both being disposed generally adjacent the blade 11. As best viewed in FIGURES 3 and 4, a loaf 16 of meat or the like can be engaged on its upper and lower surfaces by the spaced conveyors and thereby fed towards the blade. A side guide clamp 17, is shown in FIGURE 3, is laterally adjustable to operate in conjunction with a spaced stationary guide bar 18 to engage opposite sides of the loaf to thereby keep the loaf centered within the conveyor means.

In more detail, the frame 12 preferably includes three generally elongated spaced support rods 19, 21 and 22 extending substantially perpendicularly from the plane of the cutting blade 11. A pair of cross bars 23 and 24 are disposed transversely between the rods 19 and 21 and spaced longitudinally thereon. The bar 23 has a pair of blocks 26 and 27 adjacent its ends, with these blocks being mounted on the rods 19 and 21. The bar 24 is similarly mounted on rods 19 and 21 by means of blocks 28 and 29. As shown in FIGURE 5, a bracket 31 is mounted on the bar 23 for slidable movement thereon. A similar bracket 32 is slidably mounted on the cross bar 24, with the brackets 31 and 32 being joined together by a pair of longitudinally extending rods 33 and 34. A generally elongated bottom track member 36, forming a part of the bottom conveyor 13, is removably mounted on top of the brackets 31 and 32, as for example by the wing nut assembly 37 shown in FIGURE 5. It will thus be seen that the track member 36 is movable laterally of the blade along the bars 23 and 24. In order to provide for this lateral movement, a shaft 38 is rotatably supported in a bore 39 in the block 26. The shaft has a threaded portion 41 that engages a threaded bore 42 in the bracket 31, whereby rotation of the shaft causes the bracket 31 to translate along the bar 23. A manually engageable knob 43 is provided on the end of shaft 38 to facilitate rotation thereof, whereby the lateral position of the track member 36 is readily adjusted.

With regard to the top conveyor means 14, a generally upwardly extending support rod 44 is mounted adjacent one side of the track member 36, as best seen in FIGURES 4 and 5, and has a slidable bracket member 46 mounted thereon. A top track member 47, forming a part of the top conveyor 14, is pivotally mounted on the bracket 46 and adapted for pivotal movement about an axis generally parallel to the cross bar 23. The top track, as shown, is preferably shorter than the bottom track. A shaft 48 is pivotally supported by a portion 49 of the bracket 46, with a transversely extending member 51 being secured to the shaft 48 and adapted for rotation therewith. The top track member 47 is secured to the member 51 and subjacent thereto. A stop plate 52 is mounted to the bracket 46 in overlying relation with the side 53 of the track 47, and has a pair of spaced depending studs 54 and 56 in confronting relation with the side 53 on either side of the pivot shaft 48. Accordingly, the rotational movement of the track 47 is limited by the studs 54 and 56, and is restrained to a normal position substantially parallel with the bottom track 36. A pair of coil springs 57 and 58 are mounted respectively on the two studs for resiliently urging the track 47 into its parallel position. It is preferred that the track 47 be pivotally mounted substantially medially of its two ends, as shown in FIGURE 4.

The tracks 36 and 47 are each adapted to receive movable conveyor members thereon, and as here illustrated, a flexible chain 59 is disposed longitudinally around the bottom track 36, and a similar chain 61 is disposed around the top track 47. A pair of roller sprockets 62 and 63 are rotatably supported adjacent the ends of the bottom track 36, with the chain 59 engaging the sprockets for movement therewith. The front sprocket 62 preferably is driven, thus serving to drive the chain 59. A similar pair of sprockets 64 and 66 are mounted on the top track 47, with the front sprocket 64 serving as the drive sprocket. It is noted that elongated grooves 67 are extended along the supporting surfaces of the tracks 36 and 47, in order to retain the protuding link portions of the respective chains. Similar grooves 68 are also provided on each of the roller sprockets for the same purpose.

To adjust the relative spacing between the conveyors 13 and 14, so as to accommodate different sizes of loaves, a top plate 69 is secured to the rod 44, with a shaft 71 being rotatably mounted on the plate 69. A lower portion 72 of the shaft 71 is threaded, and engages a threaded bore 73 in the slidable bracket 46, whereby rotation of the shaft 71 serves to move the bracket 46 vertically along the rod 44 to vary the spacing between the conveyors. A coil spring 76 is disposed around the shaft 71 and interposed between the plate 69 and a shoulder 77 on the shaft 71, whereby the track 47 is allowed to move resiliently upwardly against the force of the spring 76 to accommodate varying heights or thickness in the loaves. A crank handle 78 is provided for manual rotation of the shaft 71.

For the purpose of gripping the end portion of a loaf, after it has passed through and is no longer engaged by the conveyor chains 59 and 61, the track members each have a plurality of restraining means such as elements 79 disposed in confronting opposed relationship on the ends of the track members adjacent the blade 11. As best seen in FIGURE 4, the tracks 36 and 47 respectively include transversely extending end members 81 and 82 disposed at the end of each track. These end members are secured to the central portion of each track by longitudinally extending side members 83, which form a substantially integral part of the respective tracks, and the knife elements 79 are secured to the members 81 and 82. Means are provided for guiding the loaves into the two conveyors 13 and 14, and in this connection, there is provided a generally stationary bottom conveyor platform 84 as best shown in FIGURES 1 and 2. The platform 84 extends generally longitudinally from adjacent the sprocket 63, and substantially coplanar with the portions of the chain 59 disposed on the upper surface of the track 36. The platform 84 includes a plurality of longitudinally spaced stationary rollers 86, each being rotatably mounted transversely between the platform sides 87. As evident in FIGURE 1, the platform 84 and conveyor 13 are preferably disposed on an incline to the horizontal, whereby loaves of meat placed on the platform are moved gravitationally into the instant feed apparatus. To retain the loaves on the platform and conveyor 13, prior to being engaged between the conveyors 13 and 14, the aforementioned side guide bar 18 is provided adjacent one side of the bottom conveyor. A similar guide bar 88 hereinbelow described in further detail is disposed along the other side of the conveyor 13, but does not extend as close to the blade 11 as does the bar 18.

Disposed intermediate the blade 11 and the end of the side bar 88 is the side guide clamp 17, which is best shown in FIGURE 3. The clamp 17 includes a bracket 89 secured to the side of the track 36, with a guide block 91 forming a part of the bracket. A transversely extending rod 92 is slidably disposed through the guide block 91, with a clamp plate 93 mounted on the inner end of the rod 92. The plate 93 is pivotally mounted on the rod 92 by means of a pair of spaced ears 94 disposed on opposed sides of the rod, with a shaft 96 extending through aligned bores in the ears and rod. The plate 93 is thus adapted for pivotal movement about an axis generally perpendicular to the track 36. Preferably, a stop portion 97 is provided on the end of the rod 92 to limit rotation of the plate 93, thereby allowing only the back end 98 of the plate to be pivoted away from the opposing guide bar 18. A spring 99 serves to urge the plate resiliently into a position in which the end 98 of the plate 93 is pivoted away from the guide bar 18.

In order to adjust the lateral position of the clamp plate 93 relative to the opposed guide bar 18, a threaded shaft 101 extends through a threaded bore 102 in the bracket 89. A back plate 103 is secured to the outer end of the rod 92, and has a bore therein through which a non-threaded portion of the shaft 101 extends. A collar 104 is provided on the inner side of the plate 103 to prevent axial movement thereof, and a coil spring 106 is positioned on the outer side of the plate 103, the spring being interposed between the plate 103 and a knob 107 mounted on the end of the shaft 101. Rotation of the knob thus varies the lateral position of the clamp plate 93, while the spring 106 allows irregularities in the thickness of the loaf 16 to move the clamp plate outwardly against the pressure of the spring.

The means for driving the conveyor chains 59 and 61 are generally the same as the drive means disclosed in the above mentioned patent for incrementally moving the back feed clamp thereof towards the blade. A segment gear 108 shown in FIGURE 3 preferably is coupled to the main drive of the slicer mechanism in the same manner as disclosed in the above patent, and it suffices here to note that the gear 108 moves back and forth one time for each cycle of the slicer blade 11. Also, as described in the patent, the segment gear 108 engages a pinion gear 109 which is coupled to a clutch assembly 111, and a threaded worm 112 extends from the clutch. The clutch 111 is adapted to produce unidirectional movement of the worm 112, and accordingly does not produce rotation of the worm for movement in one direction of the segment gear. Thus, as described in more detail in the aforesaid patent, when the slicer blade is making its cut into the loaf, the segment gear is moving in the direction for which the clutch transmits no rotation to the worm. When the blade is not cutting into the loaf, the segment gear moves in the opposite direction, which is productive of an increment of rotation in the worm. A worm gear 113 is adapted to take off the drive from the worm, and rotates a shaft 114 which is coupled to the drive sprocket 62 of the bottom conveyor. The rotation of the shaft 114 is adapted to cause the upper portion or reach of the chain 59 to move in a direction towards the blade 11. As shown in FIGURE 3, the shaft 114 is journaled in bearings 116, and also has a pinion gear 117 mounted thereon for rotation therewith. A housing 118 is mounted on the support rods 21 and 22 by means of the blocks 119 and 121, with the bearings 116 being generally formed within the housing. A pair of connecting gears 122 and 123 are also rotatably mounted in the housing 118, and transmit rotation from the gear 117 to another gear 124. The latter is mounted on a shaft 127 journaled in a second set of bearings 126 at the top of the housing. A drive shaft 128, by means of universal couplings 129 and 131, transmits rotation from the shaft 126 to the upper drive sprocket 64. In the foregoing manner, the lower portions of the upper chain 61 are synchronously driven towards the blade 11 with the opposed confronting portions of the chain 59.

To allow for the lateral movement of the conveyor 13 and 14, as described above, and as provided by rotation of the knob 43, a spline gear arrangement is used. More particularly, as shown in FIGURES 3 and 4, a pair of spline gears 132 and 133 are respectively secured to the shafts 128 and 114, with the spline gears extending slidably into complementary splined bores 134 and 136 in the drive sprockets 62 and 64. Thus, as the conveyors are moved laterally relative to the housing 118, the spline gears continue to engage and drive the respective sprockets.

Retention of the end portions of each loaf after they are no longer engaged by the conveyor chains is accomplished in the present invention by providing an end support arm 137 disposed generally beneath the cutting blade 11, and which is pivotally supported for movement in substantially the same plane as the blade. As best shown in FIGURE 3, the arm 137 is pivotally mounted on the frame 12 about a stub shaft 138, and has a lever portion 139 to form a bell crank with the arm 137. A link 141 connects at one of its ends to the lever 139, and is secured at its other end to a lever arm 142, the latter being pivotally mounted on the frame 12 about a stub shaft 143. The lever 142 is actuated by a cam member 144, which is coupled to the main drive of the slicing mechanism, and is adapted to make one full rotation for each cycle of the slicer blade. The cam 144 has a groove 146 provided on its face with an cam roller 147 mounted on the arm 142 being adapted to travel in the groove 146. When the roller 147 is positioned in one portion 148 of the cam groove, the end support arm 137 is disposed in a position below the bottom track 36, as shown in FIGURE 3. When, however, the cam roller is positioned in a generally opposite portion 149 of the cam groove, the end arm 137 is maintained in its normal position generally intermediate the top and bottom conveyors, as is generally shown in FIGURE 4. The cam 144 is adapted to cause the arm 137 to move downwardly as the blade 11 moves downwardly into the loaf, with the arm 137 always remaining spaced below the blade. As the blade moves upwardly, so does the arm 137 until it again assumes its normal position when the blade is no longer in contact with the loaf.

*Operation*

In operating the feed apparatus of the present invention, a plurality of loaves of meat can be positioned along the platform 84 and be guided down one after another onto the conveyor 13. The first loaf to be sliced can be positioned directly between the conveyors 13 and 14, with the pivotable side clamp plate 93 allowing ready insertion of the loaf. Rotation of the handle 78 enables proper spacing between the two conveyors to be obtained, and similarly, the knob 107 can be turned to adjust the correct positioning of the side clamp 17. After the loaf is engaged by the conveyors, the loaf is advanced incrementally into the blade, with each cycle of the blade cutting off another slice and advancing the loaf another increment. As noted above, variances in consistency between loaves of different material may cause the slices of meat to fall at different lateral positions. To enable the slices to fall exactly onto any suitable receiving member, the lateral positioning of the conveyors can be adjusted by means of the knob 43.

It will be appreciated that loaves of meat generally do not have a uniform thickness or diameter throughout their length. Instead, owing to the process of hanging the meat while being formed into a loaf, one end of the loaf is often thicker than the other end. The present feed apparatus is adapted to accommodate such variations in size. The top conveyor track 47 is pivotally mounted, and in conjunction with the spaced springs 57 and 58, the top conveyor is enabled to conform to any slope in the meat as it passes thereunder. Furthermore, the spring 76 allows the entire top conveyor to move upwardly relative to the bottom conveyor, as the thicker portion of a loaf passes through the feed apparatus. The side clamp 17 operates in substantially the same manner, with the spring 106 enabling the clamp plate 93 to be moved outwardly as the thicker end of the loaf engages it. In this manner the conveyors firmly grip the loaves from one to the next, without having any slippage from an abrupt change in loaf thickness between successive loaves.

When a loaf has been fed almost entirely through the conveyors, there is left an end portion that cannot be engaged by the conveyor chains. If only one loaf were to be fed into the slicer, such end portion would simply stop progressing into the blade, and remain suspended between the knife elements 79 at the ends of the tracks 36 and 47. However, by feeding a plurality of loaves continuously into the machine, the leading end of each loaf pushes the back end portion of the preceding loaf towards the blade. This alone, however, does not solve the problem. When the end portion is pushed out of engagement with the knife, it has a tendency to simply fall out from between the conveyor tracks into the path of the blade. If this were to occur, the blade would chop the end portion into many irregular fragments, and throw them at random out of the machine. The litter created by such occurrences is undesirable, and moreover the end portion of each loaf becomes completely wasted. To remedy the foregoing problem, the end support arm 137 is provided. This arm serves no function while the bulk of each loaf is being sliced, although it continues to operate with its oscillatory movement at all times. When the loaf comes down to its end portion, however, such portion is pushed up against the end support arm 137 whereby it is prevented from falling randomly into the path of the blade. As the blade begins to slice into the end portion, the arm 137 moves downwardly with the blade, always remaining spaced slightly below the blade. As the blade withdraws from the meat, and the end portion is again advanced, the arm 137 moves upwardly into its supporting position to retain again the end portion. In this manner, substantially the entire loaf can be usefully sliced, with additional slices of meat thereby being obtained out of each loaf over that possible with previous arrangements. It is noted, as shown in FIGURE 3, that the arm 137 is preferably provided with ridges 151 to assure smooth movement of the arm against the end of the loaf.

An important feature of the invention is that the feed conveying assembly, including the top and bottom conveyors, is readily removed from the machine for cleaning or maintenance. To accomplish this, the knob 43 is rotated to bring the conveyors to their furthermost position from the housing 118. At this point, the spline gears 132 and 133 fall out of engagement with the drive sprockets. It is then necessary only to loosen the wing nuts 37 whereupon the conveyors are lifted off the machine.

What is claimed is:

1. In combination with a slicing machine having a cutter mounted on a support frame, feed apparatus comprising a generally elongated first track member mounted on said frame and having one end disposed adjacent said cutter, an endless conveyor member disposed longitudinally around said track, a generally elongated second track member mounted on said frame and disposed in substantially parallel spaced relationship with said first track, a second endless conveyor member disposed longitudinally around said second track, said conveyor members having spaced confronting portions disposed intermediate said support tracks, and means for driving said conveyor members about their respective track members with said confronting portions thereof moving towards said cutter, said first and second tracks being mounted for lateral movement on said frame in a direction generally perpendicular to the longitudinal extent of said tracks.

2. In combination with a slicing machine having a cutter mounted on a support frame, feed apparatus comprising a generally elongated first track member mounted on said frame and having one end disposed adjacent said cutter, an endless conveyor member disposed longitudinally around said track, a generally elongated second track member mounted on said frame and disposed in substantially parallel spaced relation with said first track, a second endless conveyor member disposed longitudinally around said second track, said conveyor members having spaced confronting portions disposed intermediate said support tracks, and means for driving said conveyor members about their respective track members with said confronting portions thereof moving towards said cutter, one of said tracks being adjustably positioned on said frame whereby said one track may be selectively positioned in different spaced relationships to the other track, both of said tracks being mounted for lateral movement on said frame in a direction generally perpendicular to the longitudinal extent of said tracks.

3. In combination with a slicing machine having a cutter mounted on a support frame, feed apparatus comprising a generally elongated first track member mounted on said frame and having one end disposed adjacent said cutter, an endless conveyor member disposed longitudinally around said track, a generally elongated second track member mounted on said frame and disposed in substantially parallel spaced relationship with said first track, a second endless conveyor member disposed longitudinally around said second track, said conveyor members having spaced confronting portions disposed intermediate said support tracks, means for driving said conveyor members about their respective track members with said confronting portions thereof moving towards said cutter, an end support bar pivotally mounted on said frame adjacent said cutter, and means for oscillating said bar in a plane generally perpendicular to the longitudinal extent of said tracks.

4. In a slicing machine having a support frame, a cutter mounted on said frame and adapted for reciprocating movement thereon from generally upper inoperative position to a relatively lower operative position, and drive means for operating said cutter blade, feed apparatus comprising, in combination, an elongated generally planar bottom track mounted on said frame and having one end adjacent said cutter, an elongated generally planar top track in generally parallel spaced relationship with said bottom track and having one end adjacent said cutter, said two tracks defining a generally elongated feed passage therebetween, a first pair of sprocket rollers rotatably mounted adjacent each end of said bottom track, a second pair of sprocket rollers rotatably mounted adjacent each end of said top track, a first conveyor member disposed longitudinally around said first track and sprocket rollers and adapted for movement thereon, a second conveyor member disposed longitudinally around said second track and sprocket rollers and adapted for movement thereon, said conveyors having confronting opposed portions disposed intermediate said tracks, means for incrementally driving said conveyors with said opposed portions thereof moving towards said cutter, an end support bar pivotally mounted on said frame adjacent said cutter, and means for oscillating said bar in a plane generally perpendicular to the longitudinal extent of said tracks.

5. The combination of claim 4 further defined by a support rod mounted adjacent one side of said bottom track and extending generally upwardly therefrom, a bracket slidably mounted on said rod, means for selectively positioning said bracket on said rod at different spacings from said bottom track, said top track being mounted on said bracket and movable therewith whereby the height of said feed passage may be selectively varied, said bottom and top tracks being mounted for lateral movement on said frame in a direction generally perpendicular to the longitudinal extent of said tracks.

6. The combination of claim 5 further defined by said top track being pivotally mounted substantially medially of its ends on said bracket for movement about an axis extending traversely through said top track, and means resiliently urging said top track into a normal position substantially parallel to said bottom track.

7. In a slicing machine having a support frame, a cutter mounted on said frame and adapted for reciprocating movement thereon from generally upper inoperative position to a relatively lower operative position, and drive means for operating said cutter blade, feed apparatus comprising, in combination, an elongated generally planar bottom track mounted on said frame and having one end adjacent said cutter, an elongated generally planar top track in generally parallel spaced relationship with said bottom track and having one end adjacent said cutter, said two tracks defining a generally elongated feed passage therebetween, a first pair of sprocket rollers rotatably mounted adjacent each end of said bottom track, a second pair of sprocket rollers rotatably mounted adjacent each end of said top track, a first conveyor member disposed longitudinally around said first track and sprocket rollers and adapted for movement thereon, a second conveyor member disposed longitudinally around said second track and sprocket rollers and adapted for movement thereon, said conveyors having confronting opposed portions disposed intermediate said tracks, means for incrementally driving said conveyors with said opposed portions thereof moving towards said cutter, an end support member pivotally mounted adjacent said cutter and movable in a plane generally perpendicular to said tracks, said support member being normally positioned in obstructing relationship to said feed passage and mounted for reciprocating movement in and out of said obstructing relationship, and means for moving said support member downwardly when said cutter is moved downwardly to its lower position and returning said support member to its upper position when said cutter is moved to its upper position.

8. The combination of claim 7 further defined by opposed knife elements being provided on said bottom and top tracks adjacent the ends thereof proximate said cutter.

9. A slicing machine comprising, in combination, a main support frame including a pair of spaced elongated rods, a cutter mounted on said frame adjacent one end of said rods and adapted for movement in a plane perpendicular to the plane of said rods, a pair of spaced cross bars mounted transversely between said rods, an elongated planar bottom track removably mounted on said cross bars substantially parallel to the plane of said rods and adapted for movement on said cross bars in a direction generally normal to said rods, said bottom track being longitudinally aligned with said rods and having one end adjacent said cutter, a pair of bottom roller sprockets rotatably supported adjacent each end of said track for rotation about axes substantially parallel to said cross bars, an endless conveyor member disposed longitudinally around said bottom track and sprockets and adapted for movement thereon, an elongated support platform extending longitudinally from the remaining end of said bottom track and disposed substantially coplanar with the portions of said conveyor on the upper surface of said track, said platform including a plurality of longitudinally spaced rotatably mounted rollers, a support rod mounted adjacent one side of the bottom track and extending generally upwardly therefrom, a bracket slidably mounted on said support rod and adapted for stationary positioning at different positions thereon, means for adjusting the position of said bracket on said support rod, an elongated planar top track pivotally mounted on said bracket medially of the ends of said top track with the latter being disposed generally parallel to said bottom track in confronting spaced realtionship therewith, said top track being shorter than said bottom track and having one end coterminous therewith adjacent said cutter, said top track being movable with said bracket to different positions relative to said bottom track, said bottom track, said top track being pivotably on said bracket about an axle substantially parallel to said cross bars, means resiliently urging said top track into a normal position substantially parallel to said bottom track, a top pair of roller sprockets rotatably supported adjacent each end of said top track and rotatably about axes parallel to said cross bars, an endless top conveyor member disposed longitudinally around said top track and sprockets and adapted for movement thereon, opposed knife elements provided on said bottom and top tracks adjacent the coterminous ends thereof, means for driving said conveyor members synchronously with the movement of said cutter to provide an increment of conveyor movement for each cycle of movement of the cutter, said conveyors having the portions thereof intermediate said tracks moving towards said cutter, a pair of spaced side guide bars extending longitudinally along the sides of said bottom track and mounted thereon, a side guide clamp member mounted on one side of said bottom track adjacent said cutter and in spaced confronting relation to the guide bar on the opposed side of said bottom track, said clamp member being adapted for selective movement towards and from said confronting guide bar, said clamp member being pivotally mounted for movement about an axis substantially perpendicular to said bottom track, and means resiliently urging said clamp member towards a position generally parallel with said confronting guide bar.

10. The combination of claim 9 further defined by an end support member pivotally mounted on said frame and movable in a plane generally parallel to that of said cutter, said support member being disposed below said cutter and normally positioned adjacent the coterminous ends of said tracks generally medially thereof, and drive means for moving said support member downwardly to a position below said bottom plate when said cutter moves downwardly to a position obstructing the passage defined by said two tracks, said end member drive means including a lever arm secured to said end member adjacent the pivotal mounting thereof to form a bell crank, a link coupled to said lever arm and adapted to pivot said end member, a second bell crank pivotally mounted on said frame and connected at one end to said link, and a rotatable cam engaging the other end of said second bell crank for actuation thereof upon rotation of said cam, said cam being coupled to said cutter drive means for synchronous operation therewith.

11. In a slicing machine having a cutter mounted on a support frame, feed apparatus comprising a first endless conveyor mounted on said frame adjacent said cutter, a second endless conveyor mounted on said frame adjacent said cutter and spaced from said first conveyor to define a feed passage intermediate said conveyors, an end support bar pivotally mounted on said frame adjacent said cutter, means for oscillating said bar in a plane generally perpendicular to the longitudinal extent of said conveyors, and opposed knife elements provided on said conveyors adjacent the ends thereof proximate to said cutter.

References Cited by the Examiner
UNITED STATES PATENTS

| 2,060,540 | 11/36 | Straeten | 146—94 X |
| 2,126,458 | 8/38 | Englen | 146—94 |
| 2,752,968 | 7/56 | Toby et al. | 146—94 |

FOREIGN PATENTS

| 85,571 | 8/58 | Denmark. |
| 746,692 | 3/33 | France. |

J. SPENCER OVERHOLSER, *Primary Examiner.*